Feb. 6, 1951   W. S. SMITH   2,540,300
SELF-CLEANING STRAINER FOR LIQUIDS
Filed Feb. 7, 1948   4 Sheets—Sheet 4

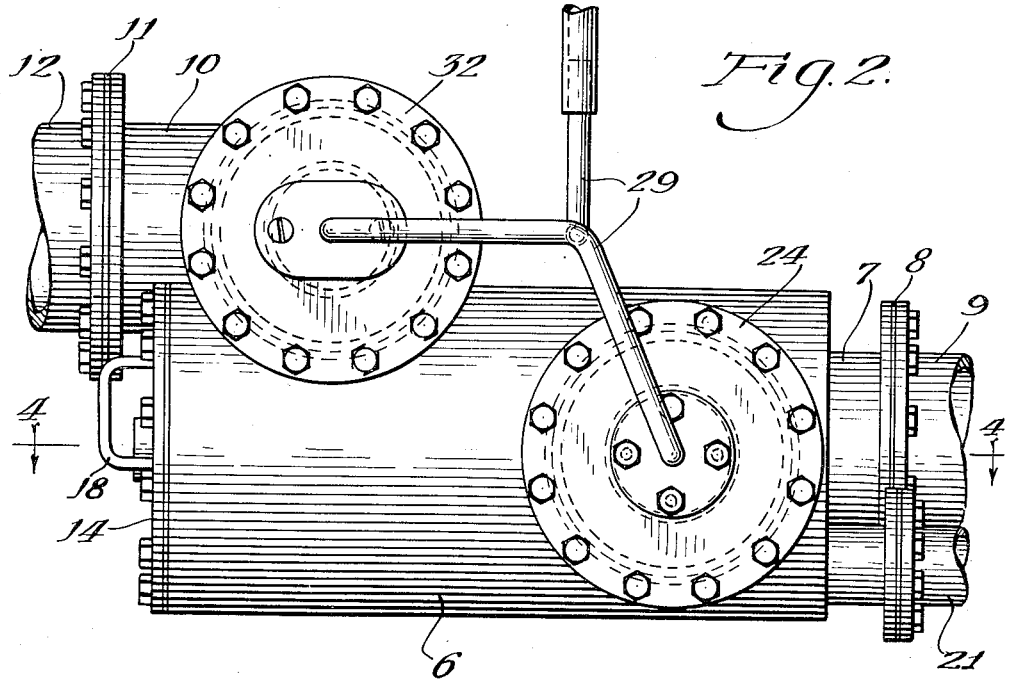
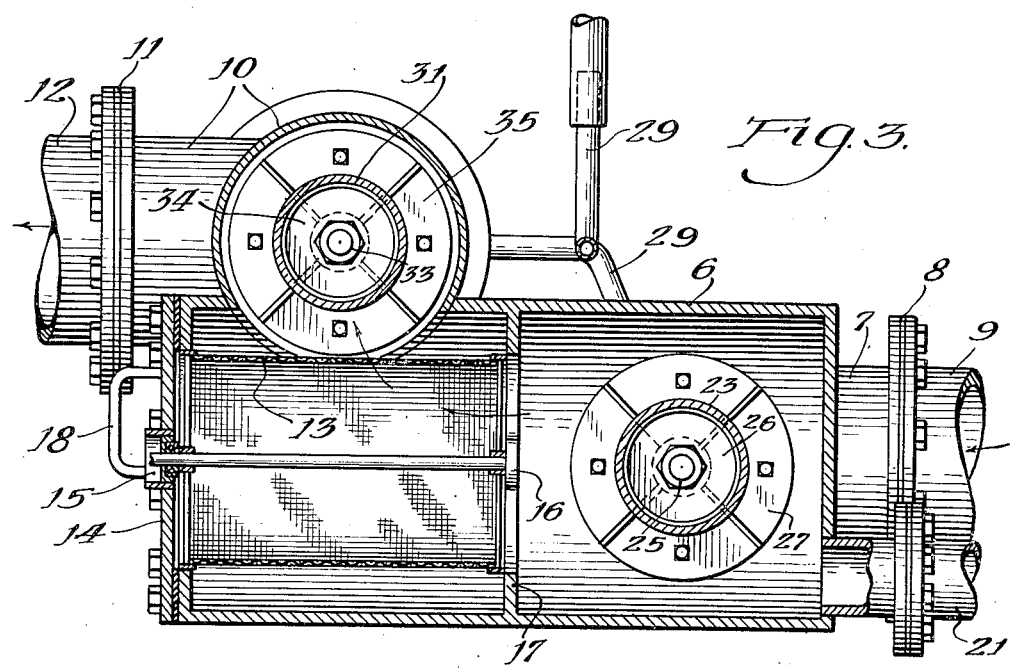

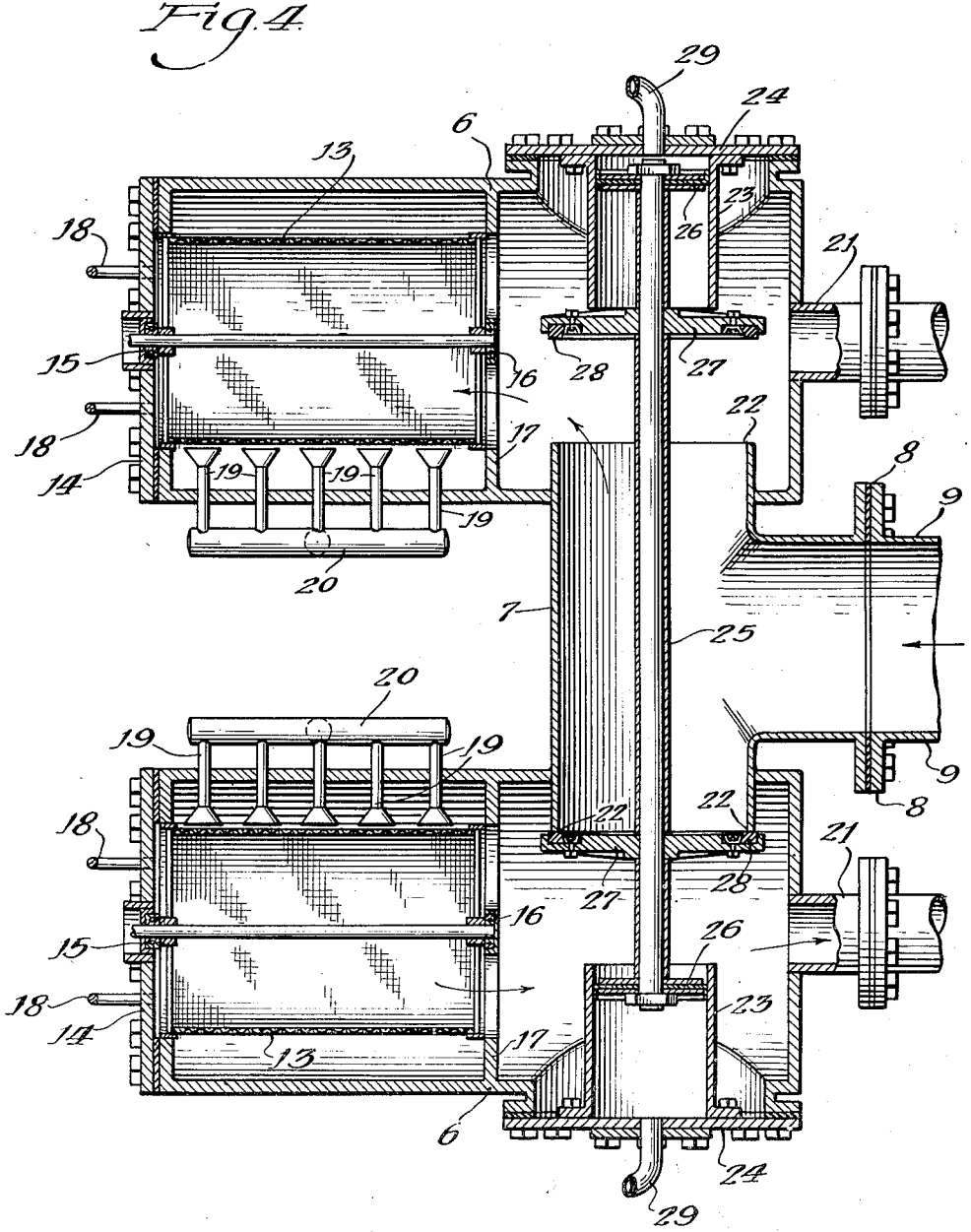

Inventor:
William S. Smith
By Critton, Schroeder, Merriam & Hofgren
Attorneys

Patented Feb. 6, 1951

2,540,300

UNITED STATES PATENT OFFICE 2,540,300

SELF-CLEANING STRAINER FOR LIQUIDS

William Stewart Smith, Chicago, Ill., assignor to Henry Pratt Company, a corporation of Illinois Application February 7, 1948, Serial No. 6,915

4 Claims. (Cl. 210—168)

This invention relates to strainers of the type used on water mains to the condensers of steam power plants, and the like.

The primary object of the invention is to provide an improved strainer which may be cleaned readily without opening the unit.

A further object of the invention is to provide apparatus in which the screens are rotatably mounted and will turn under the influence of jets of water from fixed nozzles which are directed against the screens. This action is very effective in the removal of material which may be lodged in the screen.

Another object of the invention is to provide a duplex machine, so that one screen may be in operation while the other one is being cleaned, without interruption of the flow of water through the main.

Another object of the invention is to provide power mechanism for operating the valves which may be controlled by a timing mechanism, so that the flow of water automatically will be changed from one screen to the other at regular intervals.

The invention is illustrated in a preferred embodiment in the accompanying drawings, in which—

Figure 1:
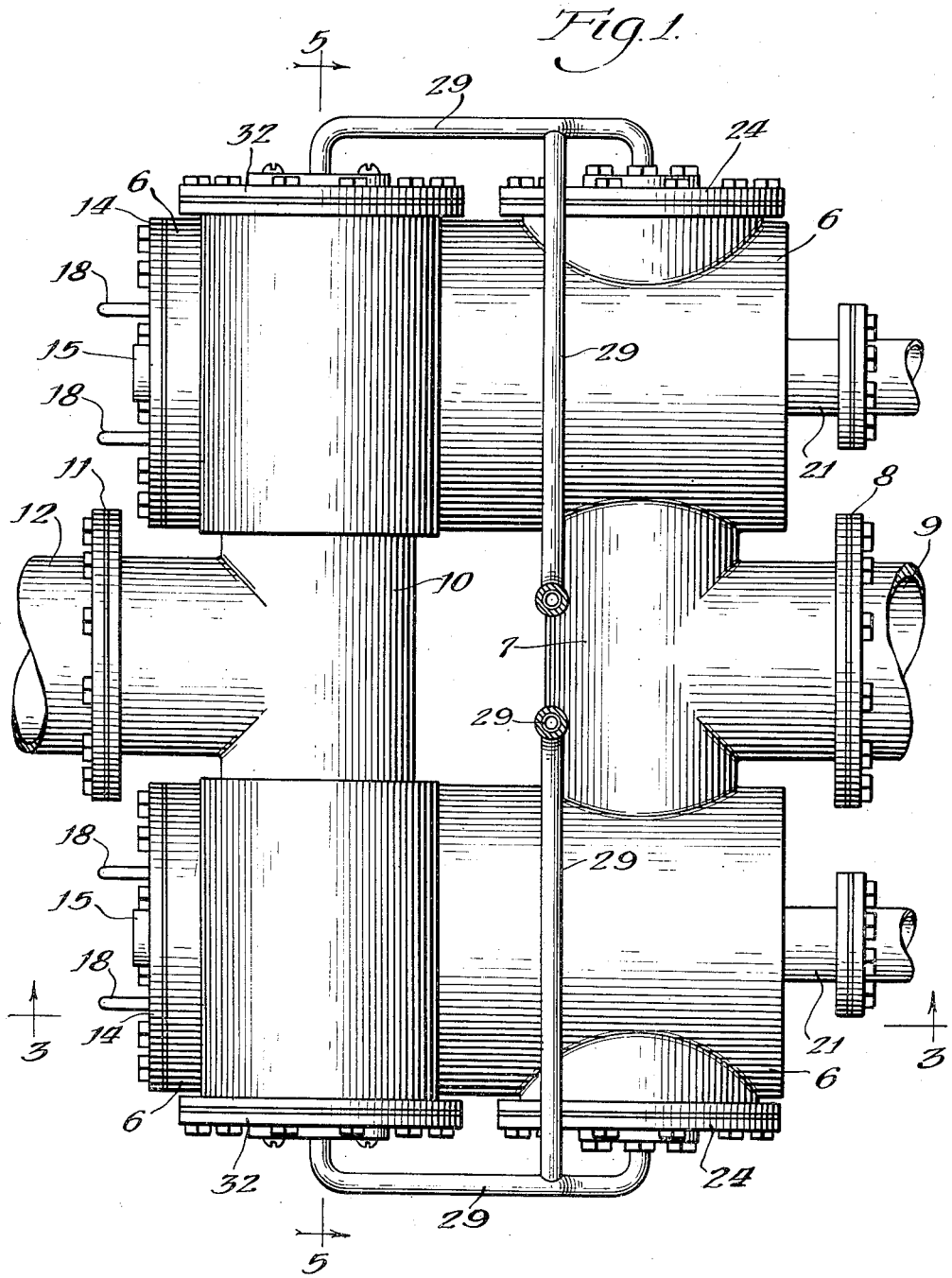

Figure 1 is a top plan view of a duplex strainer embodying the invention; Fig. 2, a side elevational view of the same; Fig. 3, a vertical sectional view, taken as indicated at line 3—3 of Fig. 1; Fig. 4, a plan sectional view, taken as indicated at line 4—4 of Fig. 2; and Fig. 5, a vertical sectional view, taken as indicated at line 5—5 of Fig. 1.

In the embodiment illustrated, a pair of screen chambers 6 are connected at one end by an inlet header 7, which makes a flanged joint 8 with an inlet water main 9. The upper rear portions of the screen chambers are connected by a header 10, which makes a flanged connection 11 with an outlet main 12. As best shown in Fig. 4, each chamber is provided at its outlet end with a rotary foraminous cylinder 13, preferably made of sheet metal, and is antifrictionally journalled at one end in a cover plate 14, as indicated at 15, and at the other end, as indicated at 16, in an upright in the wall flange 17. Preferably, the cover plates 14 are provided with handles 18 so that when the bolts are removed the screen may readily be removed for repair or replacement.

Figure 5:
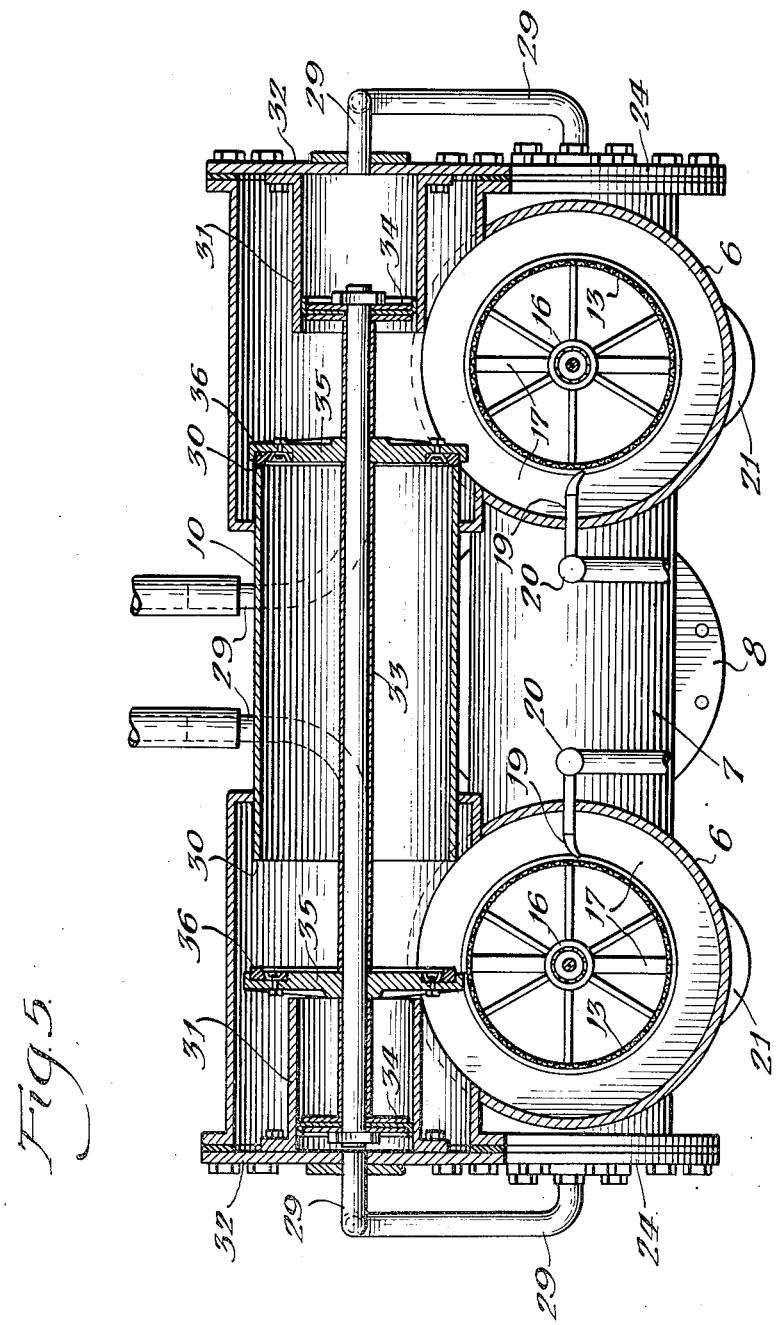

A series of fan-shaped nozzles 19 extend through the wall of the screen chamber and are connected to the water pipe 20. As best shown in Fig. 5, the nozzles are directed downwardly, so that when water is projected against the screen by the nozzles, the screen cylinder will rotate and leaves and other debris will be loosened and washed inwardly where they may flow out through a trash line 21 provided near the bottom of the inlet side of the chamber 6.

As shown in Fig. 4, the ends of the header 7 project into the valve chamber and form valve seats 22 for the inlet ports. A pair of air cylinders 23 are bolted to the inner face of cover plates 24, so as to be in concentric alignment with the valve seats 22. An actuator, in the form of a piston rod 25, extends through the header and is provided at each end with a piston head 26. Valve heads 27 are secured in spaced relation on the actuator 25, and are provided with rubber washers 28 to engage the seats 22. The heads are arranged so that when the inlet port in one chamber is open the other will be closed. The pistons are actuated by compressed air furnished by pipes 29 extending through the covers 24 into the cylinders.

As shown in Fig. 5, a similar valve arrangement is provided at the discharge end of the screen chambers, and the outlet header 10 affords valve seats 30 for the outlet ports from the chambers. The air cylinders 31 are bolted to the inside of cover plates 32 and communicate with the air pipes 29. An actuator 33 has piston heads 34 in the opposed air cylinders 31, and is provided with spaced valve heads 35 to alternately engage the opposed seats 30. Rubber packing rings 36 are provided to afford a tight seal.

In operation, the actuators 25 and 33 may be thrown to the position indicated in Fig. 4, by admitting compressed air through the pipes 29. This will cause the inlet and outlet ports to one of the chambers to be closed, and the other will be fully open. A valve, not shown, on the trash line 21 to the closed chamber, will then be open and water under high pressure admitted through nozzles 19. This will cause the screen to rotate and the loose material on the inside of the strainer will be washed back through the inlet side and discharge through the trash line. After a suitable length of time, the trash line on one side is closed, the water through the nozzles 19 is shut off, and the valves are reversed by admitting compressed air through the pipe line to the other chamber. It will be understood, as described above, that the trash line will be open to the newly closed chamber, water discharged through the nozzles, and the screen chamber flushed out. While the pistons are described as being operated by air pressure, it will be understood that they may be hydraulically operated, if preferred.

The foregoing detailed description is given for clearness of understanding only, and no unnecessary limitations should be understood therefrom, for some modifications will be obvious to those skilled in the art.

I claim:

1. A liquid screening unit, comprising a horizontal tubular member having at an intermediate portion of its length an inwardly extending annular wall flange forming a central opening having an upright member extending thereacross, said tubular member having closed ends and a screen chamber on one side of said wall flange and a valve chamber on the other side thereof, said valve chamber having an inlet opening, a cylindrical screen rotatably mounted in the screen chamber and having an open end communicating with said central opening, said screen being radially spaced inwardly from the side wall of the tubular member, an inlet valve in the valve chamber for admitting liquid to the interior of the screen, an outlet member having an outlet passageway communicating with the upper side of the screen chamber, a valve for controlling said outlet passageway, and a plurality of fan-shaped nozzles extending through the side wall of the screen chamber into the space between the screen and the screen chamber wall and having their outlet end angularly inclined substantially tangentially with the side wall of the cylindrical screen, whereby when the screen becomes clogged with trash from the liquid passing therethrough, the nozzles will direct streams of liquid tangentially against the screen to rotate and clean the same.

2. A screening unit as claimed in claim 1, including a trash outlet in the end of the valve chamber so that liquid from said nozzles will pass into the interior of the cylindrical screen and out of its open end directly to the trash outlet when the inlet valve is closed.

3. A liquid screening unit, comprising a screening chamber having a liquid inlet port and a liquid outlet port, a horizontal hollow rotary cylindrical screen having an open end and being antifrictionally journalled in said chamber so that liquid to be screened will pass through the open end of the screen to the interior thereof and out through the side wall, valves for controlling said ports, a plurality of fan-shaped nozzles passing through the side wall of the screening chamber wall to closely adjacent the exterior of the cylindrical side wall of the screen, the outlet end of said nozzles being inclined substantially tangentially to said screen side wall, whereby liquid from said nozzles will strike the screen tangentially to rotate and clean the same.

4. A screening unit as claimed in claim 3, including a duplicate of each of the above mentioned parts to form a second unit spaced laterally from the first mentioned unit, a laterally extending open ended tube connecting said units at the upstream side of the screening chambers, said upstream ends constituting valve chambers, a fluid cylinder in each of said valve chambers, a piston in each of said fluid cylinders, a piston rod connecting said pistons, and a pair of valve members on the piston rod each spaced inwardly of the adjacent piston, whereby said valve members will alternately close the open ends of the open ended tube when the respective piston is moved on its power stroke.

WILLIAM STEWART SMITH.

REFERENCES CITED

The following references are of record in the file of this patent:

UNITED STATES PATENTS

| Number | Name | Date |
| --- | --- | --- |
| 1,150,086 | Willemstyn | Aug. 17, 1915 |
| 1,675,505 | McNeal | July 3, 1928 |
| 1,758,565 | Elliott | May 12, 1930 |
| 1,788,387 | Elliott | Jan. 13, 1931 |
| 2,083,183 | Adams | June 8, 1937 |
| 2,099,502 | Stockdale | Nov. 16, 1937 |

FOREIGN PATENTS

| Number | Country | Date |
| --- | --- | --- |
| 264,011 | Great Britain | Jan. 13, 1927 |